(12) United States Patent
Jackson et al.

(10) Patent No.: US 9,094,291 B1
(45) Date of Patent: Jul. 28, 2015

(54) PARTIAL RISK SCORE CALCULATION FOR A DATA OBJECT

(75) Inventors: Adam Jackson, San Francisco, CA (US); Peter Lin, San Ramon, CA (US); Jeremy Mallen, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 450 days.

(21) Appl. No.: 13/037,275

(22) Filed: Feb. 28, 2011

Related U.S. Application Data

(60) Provisional application No. 61/423,053, filed on Dec. 14, 2010.

(51) Int. Cl.
*H04L 29/06* (2006.01)
*H04L 12/24* (2006.01)
*G06F 21/55* (2013.01)

(52) U.S. Cl.
CPC .......... *H04L 41/0604* (2013.01); *G06F 21/556* (2013.01)

(58) Field of Classification Search
CPC .... H04L 41/0604; H04L 63/20; G06F 21/556
USPC .......................................................... 726/1
See application file for complete search history.

(56) References Cited

U.S. PATENT DOCUMENTS

| | | | | |
|---|---|---|---|---|
| 8,499,331 | B1 * | 7/2013 | Yehuda et al. | 726/1 |
| 2005/0021360 | A1 * | 1/2005 | Miller et al. | 705/1 |
| 2006/0020814 | A1 * | 1/2006 | Lieblich et al. | 713/182 |
| 2008/0168453 | A1 * | 7/2008 | Hutson et al. | 718/103 |
| 2009/0300711 | A1 * | 12/2009 | Tokutani et al. | 726/1 |
| 2011/0023122 | A1 * | 1/2011 | Doi | 726/25 |
| 2011/0083190 | A1 * | 4/2011 | Brown et al. | 726/26 |
| 2011/0314549 | A1 * | 12/2011 | Song et al. | 726/25 |
| 2012/0106366 | A1 * | 5/2012 | Gauvin | 370/252 |

OTHER PUBLICATIONS

Mohammad et al., "A Formal Approach for Network Security Management Based on Qualitative Risk Analysis", 2013, pp. 244-251.*

* cited by examiner

*Primary Examiner* — Taghi Arani
*Assistant Examiner* — Thaddeus Plecha
(74) *Attorney, Agent, or Firm* — Lowenstein Sandler LLP

(57) ABSTRACT

A method for calculating a partial risk score for a data object may include identifying a request to calculate a partial risk score for a data object, the request including a partial risk score filter, and the data object being associated with one or more policies. The method may further include for each policy associated with the data object, determining whether characteristics associated with the policy match a parameter in the partial risk score filter, and when the characteristics associated with the policy match information in the partial risk score filter, including a data object risk score associated with the policy in the partial risk score for the data object.

14 Claims, 6 Drawing Sheets

PARTIAL RISK SCORE CALCULATION FOR A DATA OBJECT

RELATED APPLICATIONS

This application is related to and claims the benefit of U.S. Provisional Patent application Ser. No. 61/423,053, filed Dec. 14, 2010, which is hereby incorporated by reference.

FIELD

Embodiments of the invention relate to data loss protection, and more particularly to calculating a partial risk score for data at rest.

BACKGROUND

Data Loss Prevention (DLP) involves computer and information security, where DLP systems identify, monitor, and protect data in use (e.g., endpoint actions), data in motion (e.g., network actions), and data at rest (e.g., data storage). Typically, a DLP system creates fingerprints of sensitive information that requires protection, and then uses the fingerprints to detect the presence of sensitive information in various files, messages and the like. Sensitive information may be stored in a structured form such as a database, a spreadsheet, etc., and may include, for example, customer, employee, patient or pricing data. In addition, sensitive information may include unstructured data such as design plans, source code, CAD drawings, financial reports, etc.

Many organizations store large amounts of sensitive information in files that are accessible to users within the organization. Since access to this data is essential to the job function of many users within the organization, there are many possibilities for theft or accidental distribution of this sensitive information. Theft or benign inadvertent disclosure of sensitive information represents a significant business risk in terms of the value of the intellectual property and compliance with corporate policies, as well as the legal liabilities related to government regulatory compliance. However, with a large number of files and users, it is difficult to assess which sensitive files present a certain kind of risk or are in a certain stage of remediation.

SUMMARY

A method and apparatus for calculation of a partial risk score for data at rest is described. In an exemplary method of one embodiment, a request to calculate a partial risk score for a data object is identified, the request including a partial risk score filter, and the data object being associated with one or more policies. For each policy associated with the data object, a determination is made as to whether characteristics associated with the policy match a parameter in the partial risk score filter. When the characteristics associated with the policy match a parameter in the partial risk score filter, a data object risk score associated with the policy is included in the partial risk score for the data object.

In some embodiments, the partial risk score filter is a policy filter and the parameter in the policy filter is a policy. In some embodiments, the partial risk score filter is a status filter and the parameter in the status filter is a status. In some embodiments, the policies are hazards. In some embodiments, the characteristics associated with the policy comprise a data loss prevention policy violated by the hazard. In some embodiments the characteristics associated with the policy comprises a status of the hazard. In some embodiments, the data object is a folder comprising one or more files. In some embodiments, including a data object risk score associated with the policy in the partial risk score for the data object comprises summing the partial risk score for the data object and the data object risk score.

In some embodiments, the exemplary method includes creating a risk report; and including the partial risk score for the data object in the risk report.

In addition, a computer readable storage medium for calculation of a partial risk score is described. An exemplary computer readable storage medium provides instructions, which when executed on a processing system causes the processing system to perform a method such as the exemplary methods discussed above.

Further, a system for calculation of a partial risk score is described. An exemplary system may include a memory and a processor coupled with the memory. In some embodiments of the exemplary system, the processor is to identify a request to calculate a partial risk score for a data object wherein the request includes a partial risk score filter, and wherein the data object is associated with one or more policies. For each policy associated with the data object, the processor is to determine whether characteristics associated with the policy match a parameter in the partial risk score filter. When the characteristics associated with the policy match the parameter in the partial risk score filter, including a data object risk score associated with the policy in the partial risk score for the data object.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for calculation of a partial risk score for a data object is described. In one embodiment, a request to calculate a partial risk score for a data object is identified, the request including a partial risk score filter, and the data object being associated with one or more policies. A policy may correspond to a data loss prevention policy (DLP) violated by a file in the data object. A partial risk score filter may include one or more parameters. For each policy associated with the data object, a determination is made as to whether characteristics associated with the policy match a parameter in the partial risk score filter. When the characteristics associated with the policy match the parameter in the partial risk score filter, a data object risk score associated with the policy is included in the partial risk score for the data object.

Embodiments of the present invention provide a partial risk calculation system that calculates a partial risk score for data at rest using a partial risk score filter. As a result, the partial risk calculation system is able to reflect only the data objects that match the partial risk score filter.

In the following description, numerous details are set forth. It will be apparent, however, to one of ordinary skill in the art having the benefit of this disclosure, that embodiments of the present invention may be practiced without these specific details.

Figure 1:
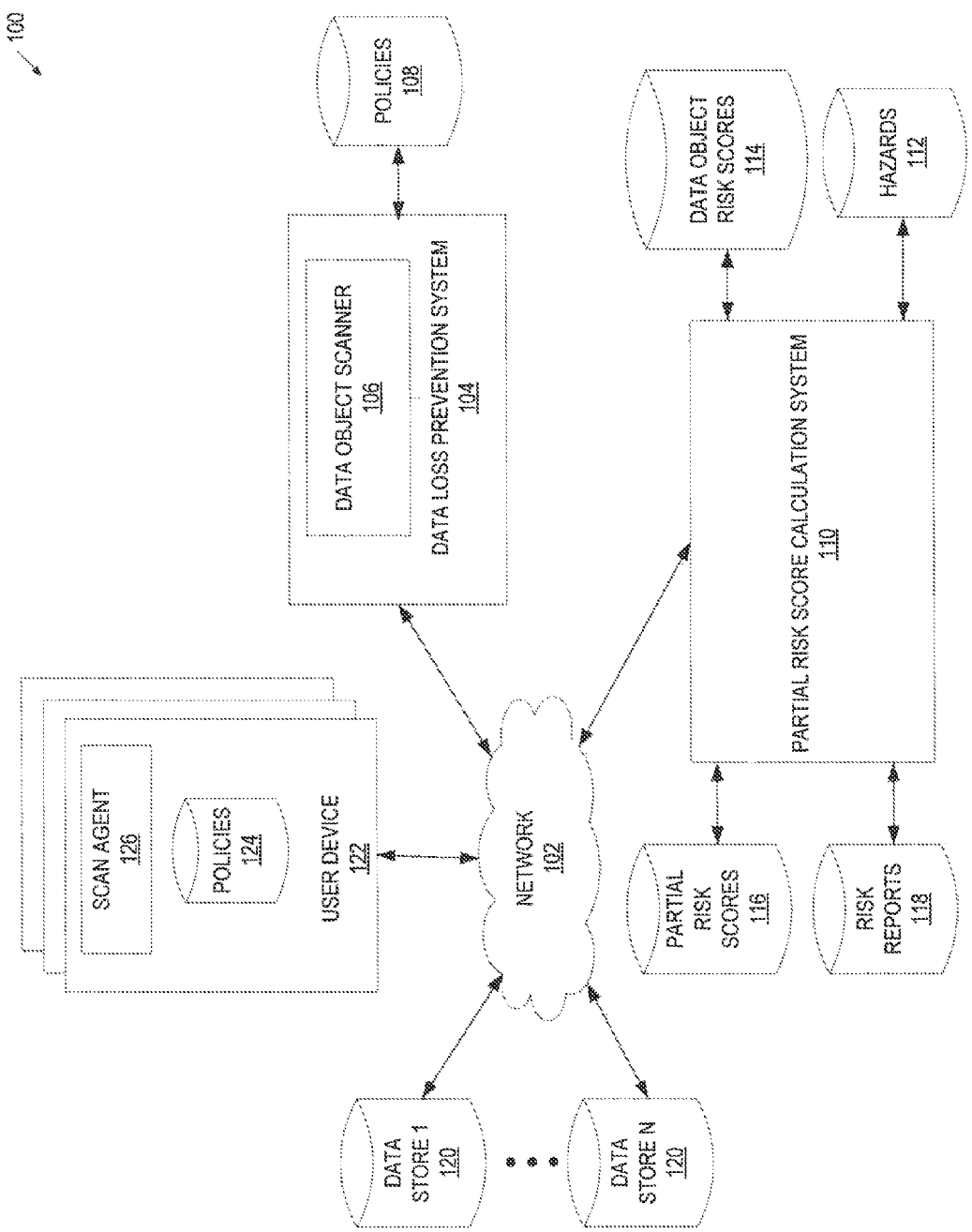
FIG. 1 illustrates an exemplary network architecture in which embodiments of the invention may operate.

FIG. 1 is a block diagram of an exemplary network architecture 100, in which embodiments of the present invention may operate. The network architecture 100 may include a data loss prevention system 104, a partial risk calculation system 110, and one or more user devices 122 coupled via a network 102 (e.g., public network such as the Internet or private network such as a local area network (LAN)). The user devices 122 may include personal computers, laptops, PDAs, mobile phones, network appliances, etc.

The data loss prevention system 104 and the partial risk calculation system 110 may reside on the same or different machines (e.g., a server computer system, a gateway, a personal computer, etc.). They may run on one Local Area Network (LAN) and may be incorporated into the same physical or logical system, or different physical or logical systems.

Alternatively, the data loss prevention system 104 and the partial risk calculation system 110, and user devices 122 may reside on different LANs that may be coupled together via the Internet but separated by firewalls, routers, and/or other network devices. In yet another configuration, the data loss prevention system 104 may reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

In some embodiments, the data loss prevention system 104 and the partial risk calculation system 110 are different systems. In some embodiments, the partial risk calculation system 110 may be incorporated in data loss prevention system 104.

The network architecture 100 further includes data stores 120 coupled to the network 102. The data stores 120 may represent a single or multiple data structures (databases, repositories, files, etc.) residing on one or more mass storage devices, such as magnetic or optical storage based disks, tapes, or hard drives. The data stores 120 may store any kind of data pertaining to the operation of an organization including emails, shared workspaces, etc. The data stores 120 can be centralized data repositories that may contain sensitive documents and therefore need to be protected by data loss prevention system 104. The data stores 120 may be, for example, part of a network-attached storage (NAS) system or a storage area network (SAN) system.

The data loss prevention system 104 protects sensitive information maintained by an organization. Sensitive information may be stored in a structured form such as a database, a spreadsheet, etc., and may include, for example, customer, employee, patient or pricing data. In addition, sensitive information may include unstructured data such as design plans, source code, CAD drawings, financial reports, human resources reports, customer or patient reports, pricing documentation, corporate mergers and acquisitions documentation, government (e.g. Securities and Exchange Commission) filings, and any other sensitive information that requires restricted user access. The data loss prevention system 104 protects sensitive information using DLP policies 108. A DLP policy includes rules for scanning content to detect the presence of sensitive information. The content to be scanned may be stored in centralized data repositories such as data stores 120 that may potentially contain documents with sensitive information. In addition, the content to be scanned may include documents associated with a client device such as user devices 122. Documents associated with a user device 122 may include documents stored locally on user device 122 and network-based documents stored for user device 122 (e.g., as part of NAS or SAN system). A document can be a file, a message, a web request or any other data item that is stored on a storage medium and is accessible using a name or any other identifier.

Data loss prevention system 104 may also instruct scan agents 126 located on one or more of the user devices 122 to scan documents stored locally for sensitive information. Data loss prevention system 104 may do this according to one or more of the DLP policies 124.

When monitoring content for the presence of sensitive information, the data loss prevention system 104 may use fingerprints of the source data to facilitate more efficient searching of the content. Fingerprints may include hashes of source data, encrypted source data, or any other signatures uniquely identifying the source data. The data loss prevention system 108 may distribute fingerprints to scan agents 126, and scan agents 126 may use fingerprints when scanning documents for sensitive information in accordance with one or more DLP policies 124. Data object scanner 106 in the data loss prevention system 104 may use fingerprints when scanning documents for sensitive information in accordance with one or more DLP policies 108.

A policy may include a set of rules that specify what sensitive information (e.g., confidential data stored in a secure repository or a secure database) needs to be present in the content being scanned in order to trigger a policy violation. In addition, policies may specify when particular content should be scanned, which content (e.g., files accessible to employees of an organization or email messages stored on a mail server of the organization) should be scanned, etc. Further, policies may specify which actions should be taken when the documents being scanned contain sensitive information. For example, the policy may require that access to the content be blocked, reported, etc. Data loss prevention system 104 creates DLP policies 108 (e.g., based on user input or based on relevant regulations) and distributes relevant DLP policies to various entities. For example, DLP policies 124 pertaining to scanning content stored on user devices 122 are distributed to user devices 122. DLP policies 108 pertain to scanning content stored in centralized data stores 120.

An organization may maintain multiple data stores 120 and may store a large number of data objects, e.g., documents, in each data store 120. The stored data objects may be frequently modified by different employees of the organization and new data objects may be often added to the data stores 120. Hence, DLP policies 108 may request that data stores 120 be scanned frequently to prevent loss of sensitive information.

In one embodiment, a DLP policy violation in a scanned data object triggers an incident. In some embodiments, when an incident is triggered, a data object risk score is calculated for the data object. In some embodiments, the data object risk score is stored in data object risk scores store 114. In some embodiments, when an incident is triggered, a determination is made of whether a hazard is associated with the incident. A hazard represents a policy violated by a specific data object (e.g., file, message, message attachment or any other document). In some embodiments, a hazard includes a data object identification (e.g., name of file), a policy identification (e.g., name of policy violated), a status identification (e.g., a status of the violation), and a data object risk score. When an incident occurs, it may or may not have a corresponding hazard. If there is a corresponding hazard, the hazard may be updated based on the incident. If a hazard is not associated with the incident, a new hazard is created. In some embodiments, there may be only one hazard for each data object and policy violation combination. In one embodiment, the hazards may be stored in hazards store 112.

Partial risk calculation system 110 can calculate a partial risk score for data at rest that has been scanned by data loss prevention system 104 based on a partial risk score filter. In some embodiments, the data at rest can include one or more data objects. In some embodiments, the one or more data objects may be one or more folders each containing one or more files. In these embodiments, each file in each folder can have one or more hazards associated with it. In some embodiments, the one or more data objects may be one or more files. In these embodiments, each file can have one or more hazards associated with it. In some embodiments, the one or more data objects may have a policy associated with each data object, rather than a hazard. In some embodiments, the partial risk score filter may identify one or more parameters, e.g., a policy, a status, a data owner, a location, etc to use in the calculation of the partial risk score. In one embodiment, partial risk calculation system 110 determines whether a data object risk score associated with each hazard in the folder should be included in the partial risk score for the folder using the one or more parameters identified in the partial risk score filter.

In some embodiments, partial risk calculation system 110 can set a current hazard to be the first hazard in the folder. In some embodiments, partial risk calculation system 110 can set a current filter to the first parameter identified in the partial risk score filter. In some embodiments, partial risk calculation system 110 can determine if any characteristic of the current hazard matches the current filter. In some embodiments, if none of the characteristics of the current hazard match the current filter, partial risk calculation system 110 can set the next hazard in the folder as the current hazard and can check whether any characteristic of the current hazard matches the current filter. In some embodiments, if any characteristic of the current hazard matches the current filter, partial risk calculation system 110 can determine if an additional parameter is included in the partial risk score filter. In some embodiments, if an additional parameter is included in the partial risk score filter, partial risk calculation system 110 can set the current filter to the additional parameter and can determine if any characteristic of the current hazard matches the current filter.

In some embodiments, if there are no additional parameters included in the partial risk score filter, partial risk calculation system 110 can determine if characteristics of the current hazard matched each of the parameters from the partial risk score filter. If the characteristics of the current hazard matched each of the parameters from the partial risk score filter, partial risk score calculator 110 can obtain a data object risk score associated with the hazard and include the data object risk score in the partial risk score for the folder. If the characteristics of the current hazard did not match each of the parameters from the partial risk score filter, partial risk score calculator 110 may not include the data object risk score in the partial risk score for the folder.

In some embodiments, prior to including the data object risk score in the partial risk score, partial risk calculation system 110 determines whether a data object risk score for the data object has been included in the partial risk score (for a different hazard). If the data object risk score has been included in the partial risk score, partial risk score calculator 110 does not include the data object risk score in the partial risk score. In one embodiment, once all of the hazards in the folder have been filtered using the partial risk score filter, the partial risk score may be stored in partial risk scores stores 116. In one embodiment, a risk report may be created using the partial risk score. In one embodiment, the risk report is displayed in a graphical user interface (GUI) viewable by a user. The risk report may be stored in risk reports 118.

Figure 2:
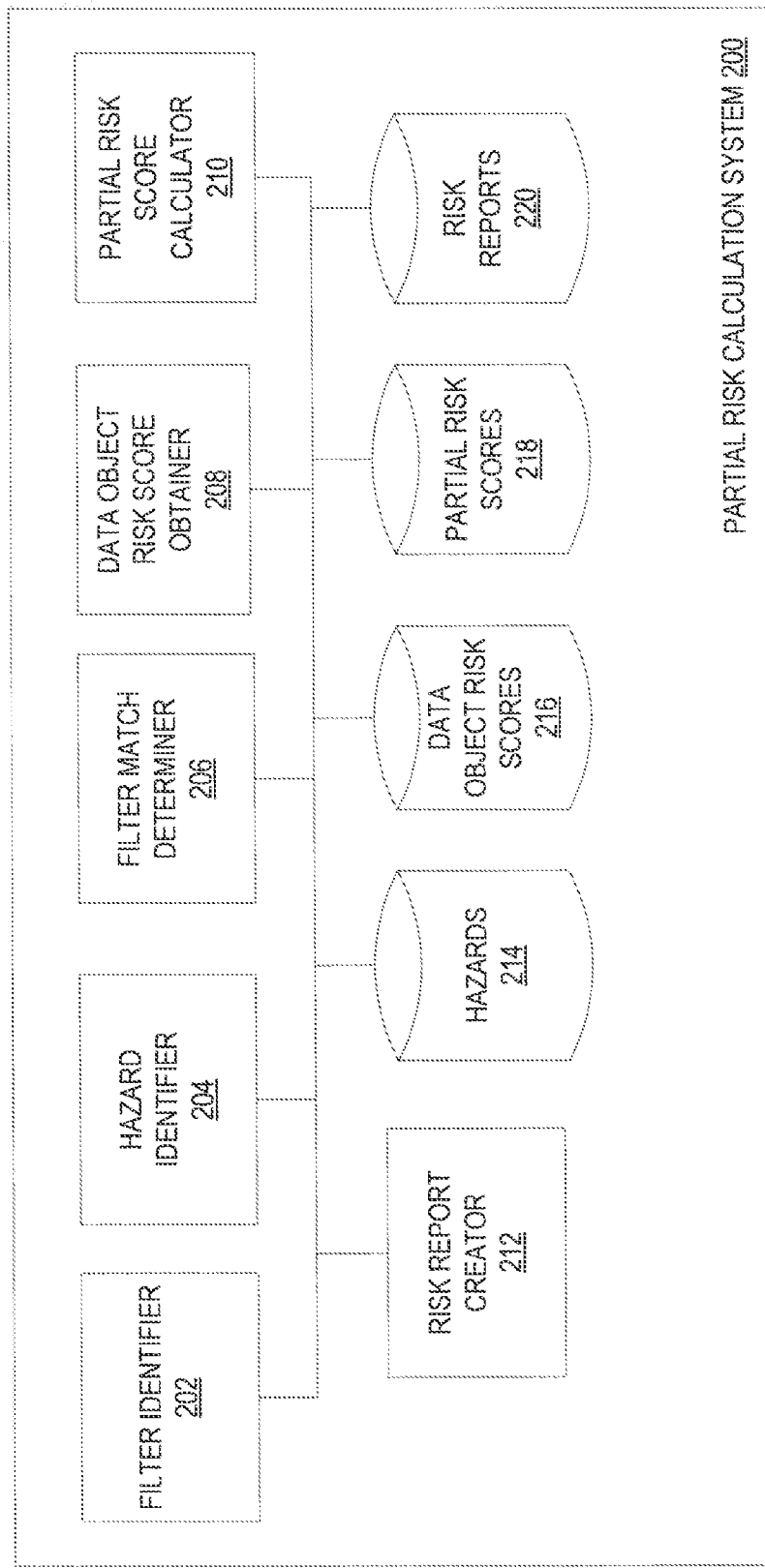
FIG. 2 is a block diagram of one embodiment of a partial risk score calculation system.

FIG. 2 is a block diagram of one embodiment of a partial risk calculation system 200. The partial risk calculation system 200 may include filter identifier 202, hazard identifier 204, filter match determiner 206, file risk score obtainer 208, partial risk score calculator 210, risk report creator 212, hazards store 214, data object risk scores store 216, partial risk scores store 218, and risk reports store 220. The components of the partial risk calculation system may represent modules that can be combined together or separated into further modules, according to some embodiments.

The filter identifier 202 may identify a partial risk score filter for calculating a partial risk score. In some embodiments, a user can request a partial risk score and can include a partial risk score filter in the request. In some embodiments, a predefined partial risk score filter can be used. In some embodiments, the predefined partial risk score filter may not specify any parameters to use to filter the data (e.g., all filters are disabled). In these embodiments, a data object risk score associated with each hazard or policy in the folder would be included in the partial risk score. In some embodiments, the partial risk score filter can include multiple parameters to use in calculating a partial risk score. For example, the partial risk score filter can include parameters such as a policy, a status, a location, a data owner, etc. In some embodiments, filter identifier 202 can set a match value for each parameter in the partial risk score filter to a positive value (e.g., policy match value set to 1, status match value set to 1, etc). In some embodiments, upon receiving a partial risk score filter, filter identifier 202 can set the first parameter in the partial risk score filter as the current filter. Once the partial risk score has been updated based on the first parameter, filter identifier 202 can set the next parameter in the partial risk score filter as the current filter. Filter identifier 202 can continue to update the current filter as long as there are additional parameters in the partial risk score filter to be used to calculate the partial risk score.

The hazard identifier 204 may identify a hazard, or policy, to analyze for calculating the partial risk score. In one embodiment, a request for a partial risk score calculation is identified for a folder, and the folder includes one or more hazards or policies. In one embodiment, hazard identifier 204 can identify a first hazard in the folder. Once an analysis is performed on the first hazard, hazard identifier 204 can identify the next hazard in the folder, and can repeat the process until all hazards in the folder have been identified and analyzed. In some embodiments, hazard identifier 204 may keep a record of which hazards in the folder have already been identified. In some embodiments, the hazards store 214 may be part of a centralized data repository and the partial risk score is to be calculated over a network. In some embodiments, once hazard identifier 204 has identified a hazard, hazard identifier 204 may obtain the hazard from hazards store 214.

The filter match determiner 206 may determine whether one or more characteristics of a hazard identified by hazard identifier 204 match (e.g., have the same value as) a parameter in the partial risk score filter identified by filter identifier 202. In some embodiments, characteristics are associated with a hazard and are stored in hazards store 214. Filter match determiner 206 can extract characteristics of a hazard from the hazards store 214 based on the hazard. In some embodiments, the extracted characteristics may include a file identification, a policy identification, a status identification, and a location identification (e.g., pathname). In some embodiments, if the characteristics of the hazard match the parameters in the filter, filter match determiner 206 sets a match value for the filter to a positive value (e.g., filter match value is set to 1). In some embodiments, if the characteristics of the hazard do not match the parameters in the filter, filter match determiner 206 sets a match value for the filter to a negative value (e.g., filter match value is set to 0).

The data object risk score obtainer 208 obtains a data object risk score associated with a hazard identified by filter identifier 202. In some embodiments, data object risk score obtainer 208 only obtains the data object risk score if the match value for each filter in the partial risk score filter identified by filter identifier 202 is positive. In some embodiments, data object risk score obtainer 208 may obtain the data object risk score from a data loss prevention system. In some embodiments, data object risk score obtainer 208 may obtain the data object risk score from data object risk scores store 216. In some embodiments, data object risk score obtainer 208 may obtain the data object risk score by extracting the data object risk score from the hazards store 214.

Partial risk score calculator 210 can calculate a partial risk score for a data object using the partial risk score filter identified by filter identifier 202. In some embodiments, the data object is a folder. In some embodiments, a calculation of the partial risk score can be performed at predefined times for a folder. In some embodiments, a calculation of the partial risk score can be performed when a file in a folder is added or modified. In some embodiments, a calculation of the risk score can be performed when a policy violation is detected for a file in a folder. In some embodiments, the partial risk score is calculated by aggregating the data object risk scores obtained by data object risk score obtainer 208. In some embodiments, the partial risk score may be calculated by summing the data object risk scores. In other embodiments, the partial risk score may be calculated by multiplying the data object risk scores. In some embodiments, the partial risk score is updated each time data object risk score obtainer 208 obtains a data object risk score. In other embodiments, the partial risk score may be calculated only once all hazards have been identified and analyzed, and all data object risk scores associated with hazards that match the partial risk score filter have been obtained for a folder. The partial risk score can be stored in partial risk scores store 218.

Risk report creator 212 can create a risk report using the partial risk score for data at rest. In some embodiments, the risk report can include the partial risk scores for folders selected by a user without including the data object risk score for data objects within the folder. In some embodiments, the risk report can include the partial risk score for a folder and additional data, such as the filters in the partial risk score filter used to filter the data objects and calculate the partial risk score. In some embodiments, the partial risk report can include the owners of the files in the folder included in the partial risk score. In some embodiments, the risk report is displayed in a graphical user interface (GUI) viewable by a user. The risk report may be stored in risk reports 220.

Figure 3:
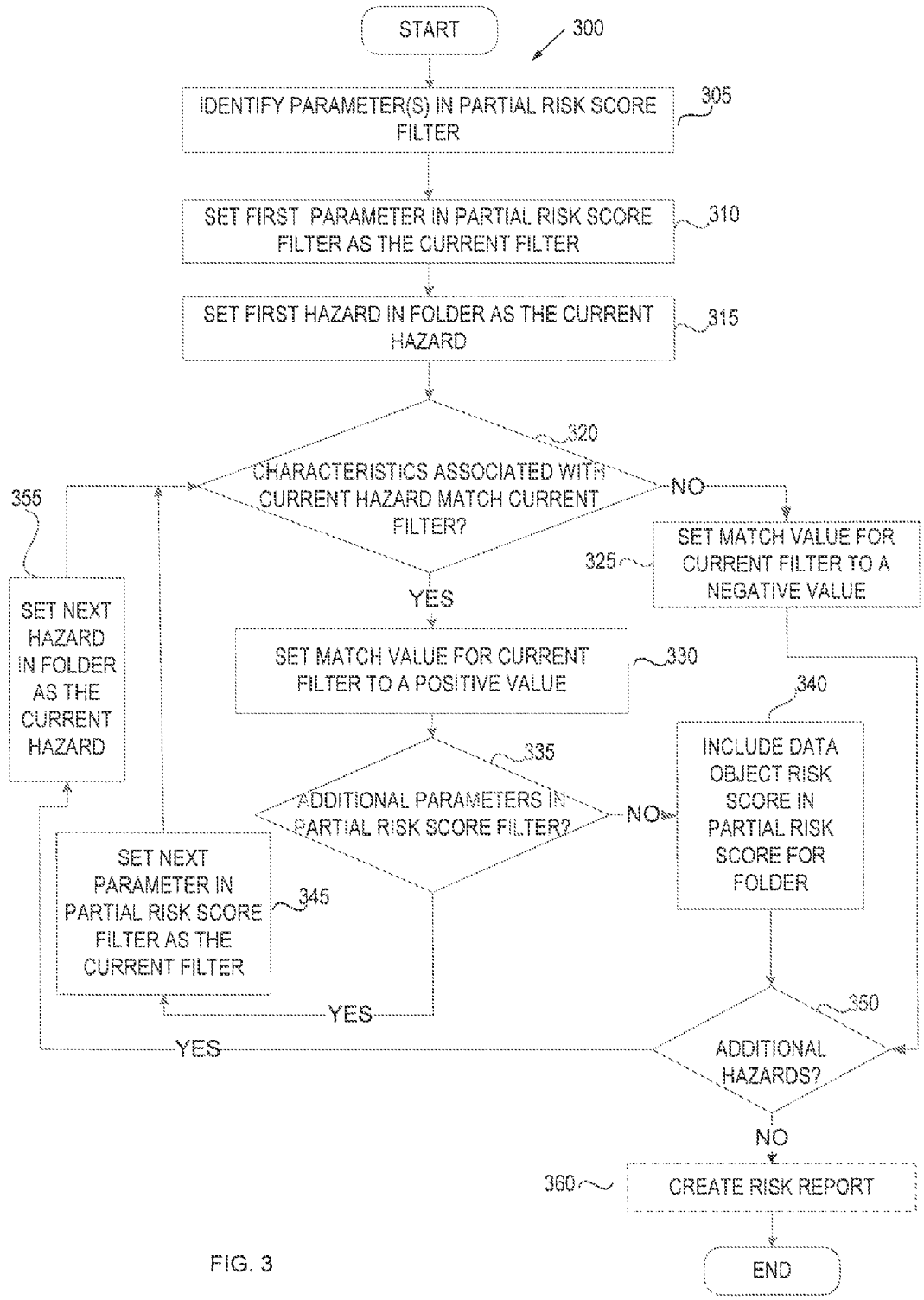
FIG. 3 is a flow diagram of one embodiment of a method for calculating a partial risk score for data at rest.

FIG. 3 is a flow diagram of one embodiment of a method 300 for calculating a partial risk score for a data object. The method 300 is performed by processing logic that may comprise hardware (circuitry, dedicated logic, etc.), software (such as is run on a general purpose computer system or a dedicated machine), or a combination of both. In one embodiment, the method 300 is performed by partial risk calculation system 114 of FIG. 1 or partial risk calculation system 200 of FIG. 2.

Referring to FIG. 3, processing logic begins by identifying a partial risk score filter for calculating a partial risk score at step 305. In some embodiments, a user can request a partial risk score and can include a partial risk score filter in the request. In some embodiments, the partial risk score filter can include multiple parameters to use in calculating a partial risk score. For example, the partial risk score filter can specify a policy, a hazard status, a data location, a data owner, etc. For example, a user may want a partial risk score that only includes hazards associated with HIPAA violations with any hazard status, any data owner, and any data location. In this example, the partial risk score filter may look like:
 policy=HIPAA;
 status=*;
 data owner=*;
 location=*.

In some embodiments, a user request may not include a partial risk score filter. In these embodiments, a predefined partial risk score filter can be used. In some embodiments, the predefined partial risk score filter may not specify any parameters to use. In these embodiment, the predefined partial risk score filter may specify a value for each parameter that will match all hazards, such as:
 policy=*;
 status=*;
 data owner=*;
 location=*.

In some embodiments, processing logic can set a match value for each parameter in the partial risk score filter to a positive value (e.g., policy match value set to 1, status match value set to 1, etc).

At step 310, processing logic can set the first parameter in the partial risk score filter as the current filter.

At step 315, processing logic can identify a first hazard in a folder to analyze for calculating the partial risk score. In one embodiment, characteristics of the first hazard are obtained.

At step 320, processing logic determines whether any characteristic of the current hazard matches (e.g., has the same value as) the current filter. In some embodiments, processing logic extracts the characteristics of the hazard from the hazard store. For example, if the current filter is a policy with a value of "HIPAA", processing logic would determine if a policy associated with the hazard has a value of "HIPAA". If any characteristic of the current hazard matches the current filter, the method 300 proceeds to step 330. If none of the characteristics of the current hazard match the current filter, the method 300 proceeds to step 325.

At step 325, processing logic sets a match value for the current filter to a negative value (e.g., 0). For example, if the current filter is a policy with a value of "HIPAA", processing logic could set the policy match value to zero (0) because none of the characteristics of the current hazard match the policy (e.g., the policy characteristic of the current hazard was "SEC"). The method 300 then proceeds to step 350.

At step 330, processing logic sets a match value for the current filter to a positive value (e.g., 1). For example, if the current filter is a policy with a value of "HIPAA", processing logic could set the policy match value to one (1) because the characteristic of the current hazard matched the policy (e.g., the policy characteristic of the current hazard was "HIPAA"). The method 300 then proceeds to step 335.

At step 335, processing logic determines whether an additional parameter exists in the partial risk score filter to use in the calculation of the partial risk score. In one embodiment, the determination can be made by determining if the partial risk score filter included another parameter that does not have a value of wildcard (e.g., "*"). In an alternate embodiment, all possible parameters can be used, regardless of the value of the parameter. In this embodiment, the determination can be made by determining if all possible filter parameters have been analyzed. If there is an additional filter parameter in the partial risk score filter, the method proceeds to step 345. If there are no additional filter parameters in the partial risk score filter, the method 300 proceeds to step 340.

At step 340, processing logic includes the data object risk score in the partial risk score for the folder. In some embodiments, the partial risk score is calculated by aggregating the data object risk score associated with the current hazard with a previous value of the partial risk score. For example, if the previous value of the partial risk score was 17 and the data object risk score associated with the current hazard is 21, the updated partial risk score could be calculated to be 38. In one embodiment, processing logic aggregates the current data object risk score with the previous value of the partial risk score by summing the values. In an alternate embodiment, processing logic aggregates the current data object risk score with the previous value of the partial risk score by multiplying the values. In other embodiments, processing logic aggregates the current data object risk score with the previous value of the partial risk score by performing a different operation on the values.

At step 345, processing logic sets the next parameter in the partial risk score filter as the current filter because there are additional parameters in the partial risk score filter. The method 300 then returns to step 320.

At step 350, a determination is made of whether there are additional hazards in the folder that need to be analyzed for inclusion in the partial risk score calculation. The determination can be positive if all of the hazards in the folder have not been analyzed. The determination can be negative if all of the hazards in the folder have been analyzed. If there are additional hazards to be analyzed, the method 300 proceeds to step 355. If there are no additional data objects, the method 300 proceeds to step 360.

At block 355, processing logic sets the next hazard in the folder as the current hazard. In some embodiments, processing logic sets the match values of all filter parameters to a positive value (e.g., 1) when setting the next hazard in the folder as the current hazard. The method 300 then returns to step 320.

At step 360, processing logic creates a risk report using the partial risk score for a data object. In some embodiments, the risk report can normalize the partial risk scores for the folders included in the risk report. For example, the highest partial risk score included in the risk report can be set to a value of 100, and the other partial risk scores are normalized to a scale of 1-100 based on a comparison with the highest partial risk score. In some embodiments, the risk report can include the partial risk scores for folders selected by a user without including the data object risk score for data objects within the folder. In some embodiments, the risk report can include the partial risk score for a folder and additional data, such as the policy and status used to filter the data objects and calculate the partial risk score. In some embodiments, the partial risk report can include the owners of the files in the folder included in the partial risk score. In some embodiments, the risk report is displayed in a graphical user interface (GUI) viewable by a user.

Figure 4:
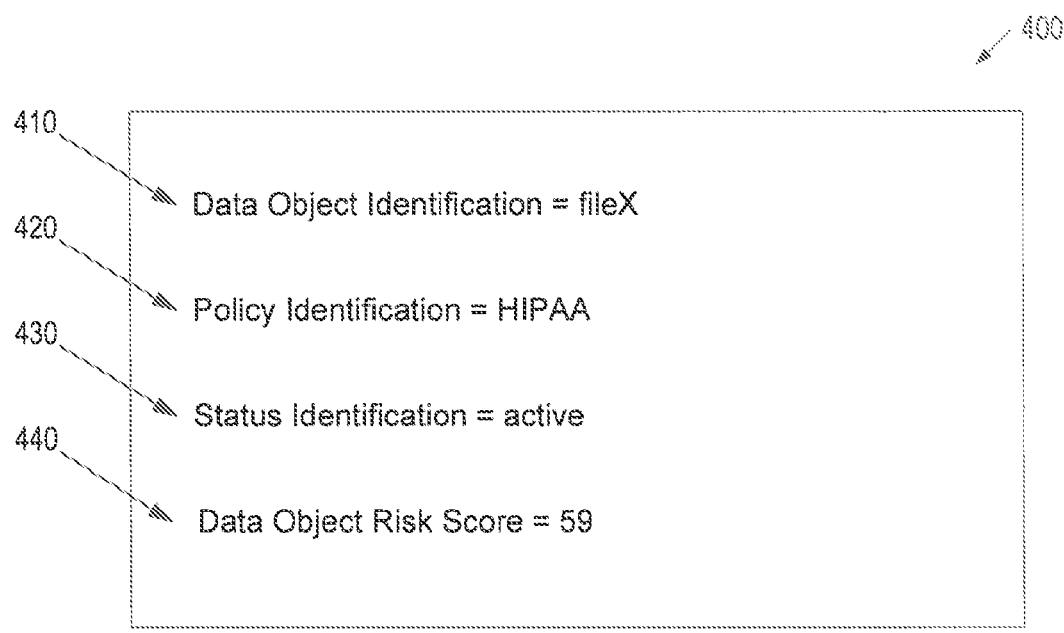
FIG. 4 illustrates an exemplary hazard used in calculating a partial risk score for data at rest in accordance with one embodiment of the invention.

FIG. 4 illustrates an exemplary hazard, in accordance with one embodiment of the invention. In this example, hazard 400 has several characteristics including data object identification 410. In some embodiments, data object identification 410 may be a name of the data object that triggered the hazard. In some embodiments, hazard characteristics include policy identification 420. Policy identification 420 may include the name of a policy whose violation by data object identification 410 caused the hazard 400 to be created. Policy identification 420 may include a name or identification of a policy which a data loss prevention system detects a violation of (e.g, Health Insurance Portability and Accountability Act [HIPAA], Securities and Exchange Commission [SEC], Payment Card Industry [PCI], etc). Status identification 430 may include the status of the hazard 400. In a data loss prevention system, courses of action may be taken to remediate or fix a violation that caused a hazard. The status of the hazard may be updated to reflect any courses of action taken to fix the violation of policy identification 420. Examples of the status are: active, remediated, false positive, under investigation, unassigned, escalated, etc. In some embodiments, a user can create custom statuses for a hazard.

Figure 5:
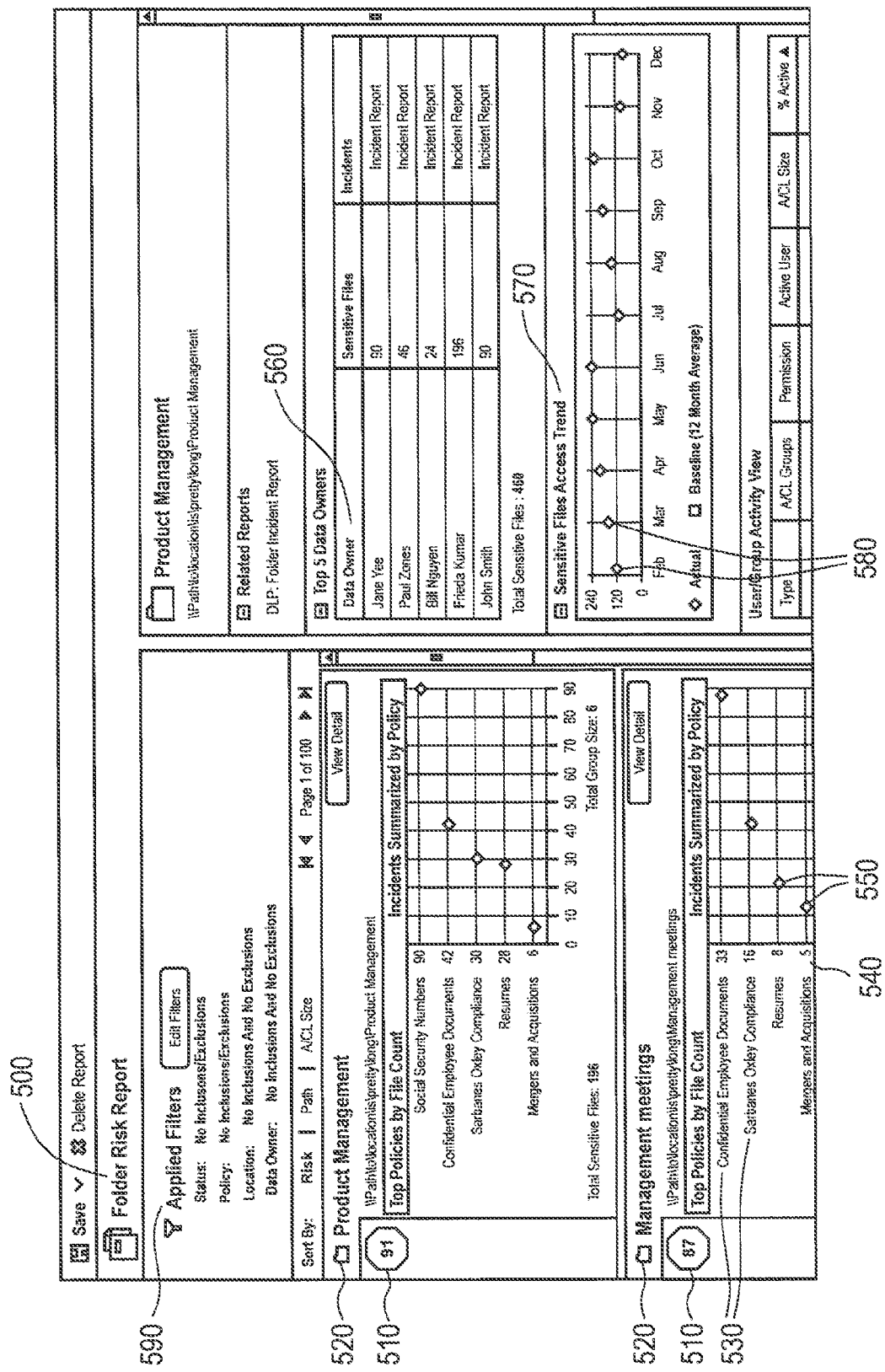
FIG. 5 illustrates an exemplary graphical user interface for displaying a partial risk score for data at rest in accordance with one embodiment of the invention.

FIG. 5 illustrates an exemplary GUI for presenting a risk report, in accordance with one embodiment of the invention. In this example, GUI 500 presents a partial risk score 510 for a folder 520. In some embodiments, the risk report may also include additional data for a folder 520. One or more DLP policies 530 violated in the folder 520 may be listed. A number of files 540 violating the DLP policies 530 within the folder 520 may also be included in the risk report. A number of incidents 550 associated with a file in folder 520 may be included in the risk report. Owners 560 owning a large number of sensitive files may be included in the risk report. An access trend 570 may be included in the risk report showing the number of sensitive files 580 across a time period (e.g., every month for 12 months). One or more filters 590 can be set to calculate a partial risk score for a folder 520. In one embodiment, if filters 590 include more than one filter, the filters are concatenated into a single partial risk score filter.

Figure 6:
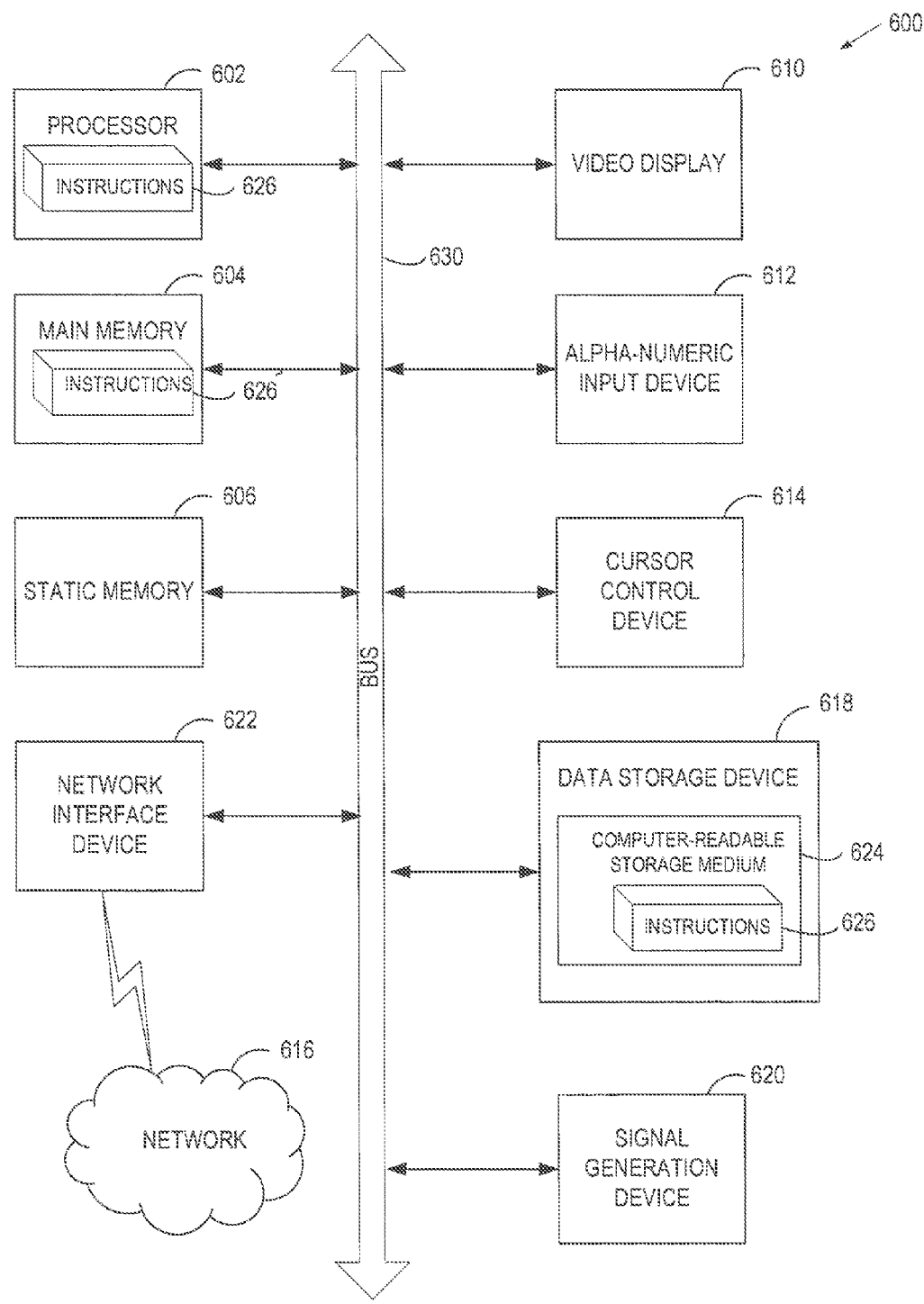
FIG. 6 is a block diagram of an exemplary computer system that may perform one or more of the operations described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a computer-readable medium 624 on which is stored one or more sets of instructions (e.g., software 626) embodying any one or more of the methodologies or functions described herein. The software 626 may also reside, completely or at least partially, within the main memory 604 and/or within the processor 602 during execution thereof by the computer system 600, the main memory 604 and the processor 602 also constituting computer-readable media. The software 626 may further be transmitted or received over a network 616 via the network interface device 622.

While the computer-readable medium 624 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, optical media, and magnetic media.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "applying", "refraining", "scanning", "updating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer selectively activated or reconfigured by a computer program stored in the computer. As discussed above, such a computer program may be stored in a computer readable medium.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A computer-implemented method comprising:
    determining one or more hazards for a data object, wherein each hazard represents a violation of a data loss prevention (DLP) policy by the data object, each hazard comprising a set of characteristics and a stored risk score calculated for the violation;
    identifying a request to calculate a partial risk score for the data object, wherein the request comprises a partial risk score filter;
    for each of the one or more hazards, performing partial risk score determination comprising:
        determining whether a characteristic of the set of characteristics associated with the hazard matches a parameter in the partial risk score filter, and
        when the characteristic associated with the hazard matches the parameter in the partial risk score filter, adding a respective stored risk score to the partial risk score for the data object; and
    upon completing the partial risk score determination for the one or more hazards, providing the partial risk score in response to the request to a data loss prevention system to protect sensitive information associated with the data object from being exposed outside of a computer network.

2. The computer-implemented method of claim 1, wherein the partial risk score filter is a policy filter and the parameter in the policy filter is a policy.

3. The computer-implemented method of claim 1, wherein the partial risk score filter is a status filter and the parameter in the status filter is a status.

4. The computer-implemented method of claim 1, wherein at least one characteristic of the set of characteristics associated with the hazard comprises a status of the violation.

5. The computer-implemented method of claim 1, wherein the data object is a folder comprising one or more files.

6. The computer-implemented method of claim 1, further comprising
creating a risk report; and
including the partial risk score for the data object in the risk report.

7. A non-transitory computer readable storage medium that provides instructions, which when executed on a processing device cause the processing device to perform a method comprising:
determining one or more hazards for a data object, wherein each hazard represents a violation of a data loss prevention (DLP) policy by the data object, each hazard comprising a set of characteristics and a stored risk score calculated for the violation;
identifying a request to calculate a partial risk score for the data object, wherein the request comprises a partial risk score filter;
for each of the one or more hazards, performing partial risk score determination comprising:
determining whether a characteristic of the set of characteristics associated with the hazard matches a parameter in the partial risk score filter, and
when the characteristic associated with the hazard matches the parameter in the partial risk score filter, adding a respective stored risk score to the partial risk score for the data object; and
upon completing the partial risk score determination for the one or more hazards, providing the partial risk score, in response to the request, to a data loss prevention system to protect sensitive information associated with the data object from being exposed outside of a computer network.

8. The non-transitory computer readable storage medium of claim 7, wherein the partial risk score filter is a policy filter and the parameter in the policy filter is a policy.

9. The non-transitory computer readable storage medium of claim 7, wherein the partial risk score filter is a status filter and the parameter in the status filter is a status.

10. The non-transitory computer readable storage medium of claim 7, wherein at least one characteristic of the set of characteristics associated with the hazard comprises a status of the violation.

11. The non-transitory computer readable storage medium of claim 7, wherein the data object is a folder comprising one or more files.

12. The non-transitory computer readable storage medium of claim 7, wherein the method further comprises:
creating a risk report; and
including the partial risk score for the data object in the risk report.

13. A system comprising:
a memory; and
a processing device coupled with the memory to:
determine one or more hazards for a data object, wherein each hazard represents a violation of a data loss prevention (DLP) policy by the data object, each hazard comprising a set of characteristics and a stored risk score calculated for the violation;
identify a request to calculate a partial risk score for the data object, wherein the request comprises a partial risk score filter;
for each of the one or more hazards, performing partial risk score determination comprising:
determine whether a characteristic of the set of characteristics associated with the hazard matches a parameter in the partial risk score filter, and
when the characteristic associated with the hazard matches the parameter in the partial risk score filter, add a respective stored risk score to the partial risk score for the data object; and
upon completing the partial risk score determination for the one or more hazards, provide the partial risk score, in response to the request, to a data loss prevention system to protect sensitive information associated with the data object from being exposed outside of a computer network.

14. The system of claim 13, wherein the processing device is further to:
create a risk report; and
include the partial risk score for the data object in the risk report.

* * * * *